April 19, 1949.                    R. W. FRENCH                           2,467,972
                        COMBINED BEAM INDICATOR, COMPASS
                            AND GYRO-HORIZON FOR AIRCRAFT
Filed April 19, 1947                                                2 Sheets-Sheet 1
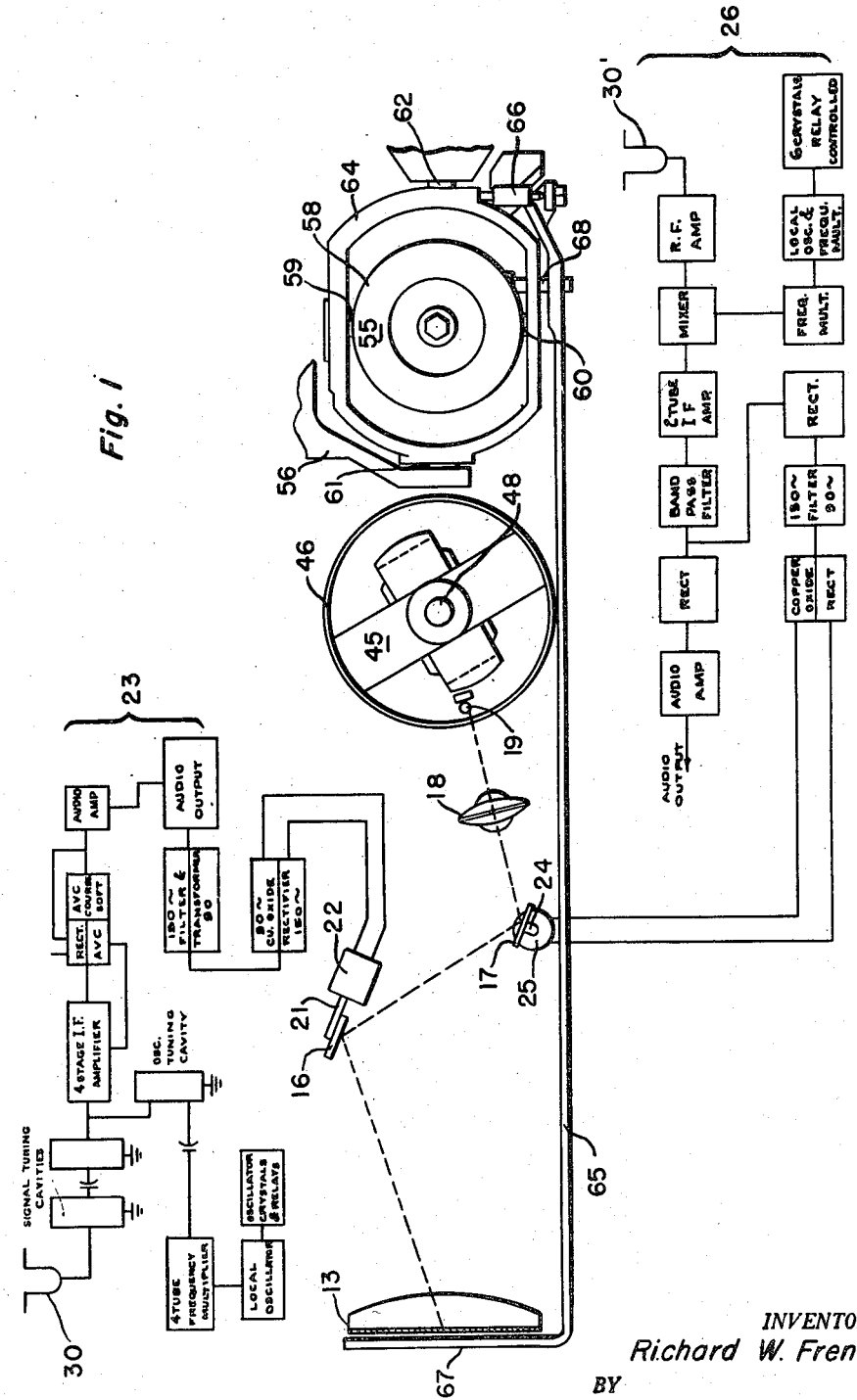
INVENTOR.
Richard W. French
BY
Hyde W. Ballard
Attorney

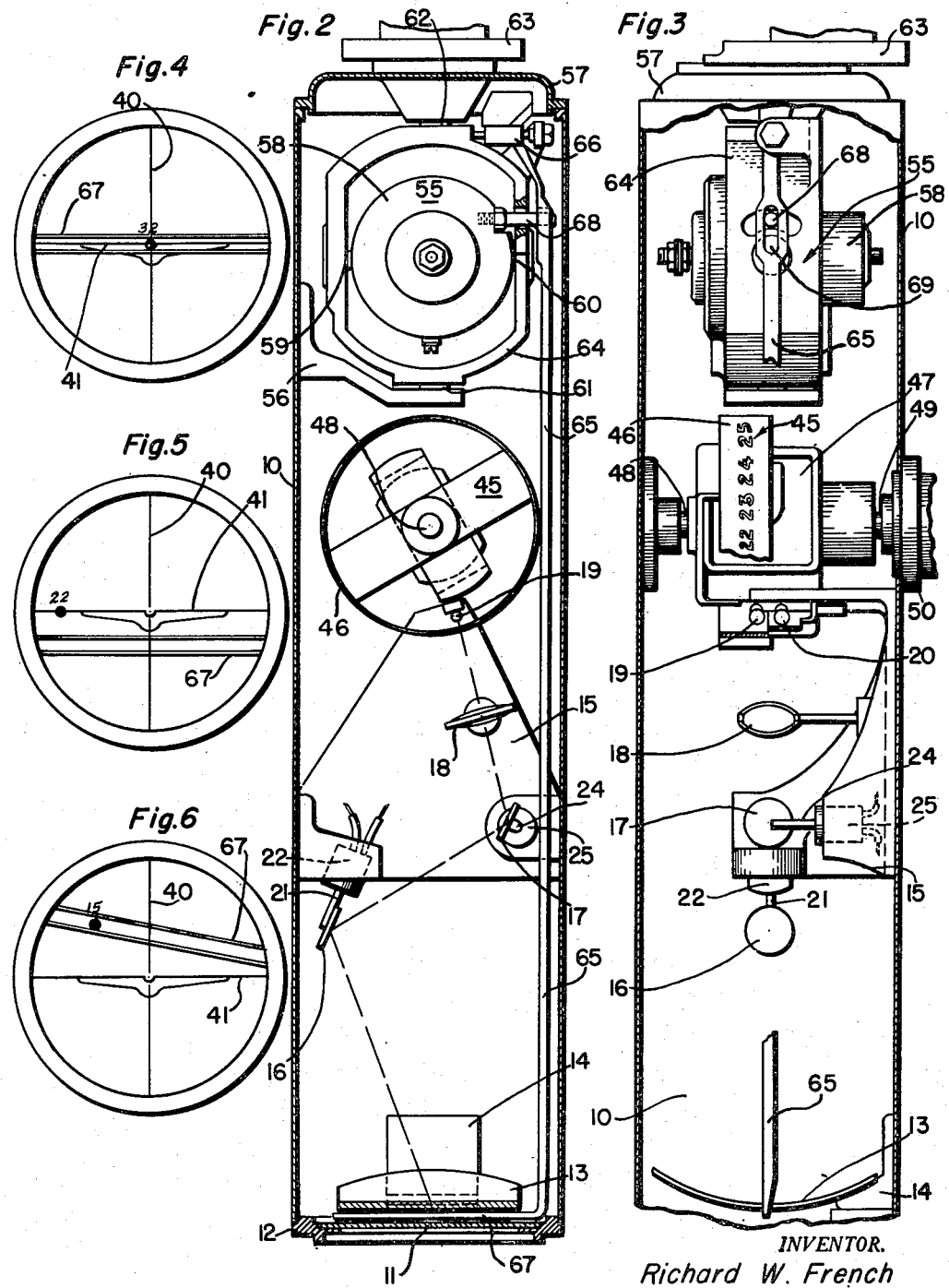

Patented Apr. 19, 1949

2,467,972

UNITED STATES PATENT OFFICE 2,467,972

COMBINED BEAM INDICATOR, COMPASS, AND GYRO-HORIZON FOR AIRCRAFT

Richard W. French, Ocean City, N. J.

Application April 19, 1947, Serial No. 742,711

8 Claims. (Cl. 343—107)

My invention relates to instrument landing systems for aircraft and, more particularly, to an aircraft instrument adapted to give on one dial simultaneous readings of compass direction, gyro-horizon, and the position of the aircraft with respect to a radio beam commonly employed in making "blind" or instrument landings.

I have found that a factor contributing largely to aircraft accidents, particularly in making instrument landings, has been the inability of the pilot to correlate within a split second the readings of several instruments in the plane which have heretofore been located in different positions on the instrument panel. It is necessary for the pilot to keep his eyes at all times on the beam indicating instrument and at the same time check the gyro-horizon as well as the compass. All this must be done in addition to watching other important instruments, such as, air speed indicator, tachometer, fuel gauges, etc. Investigations of several accidents, which occurred in the course of instrument landings, have led to the conclusion that, although all instruments were functioning, it was a physical impossibility for the pilot to read all of them, correlate the results, and make the necessary corrections in his approach within the space of a few seconds.

In addition, I have found that instruments heretofore used for indicating the flight path of an aircraft with respect to a radio beam, have been cumbersome and extremely confusing in regard to the indications given, and I have, therefore, provided an aircraft instrument which correlates automatically the horizontal and vertical position of the aircraft with respect to the proper approach into a single indication on the instrument dial.

A primary object of the invention, therefore, is to construct a single instrument for aircraft which gives combined gyro-horizon, compass, and radio beam readings on the same dial.

A further object of the invention is to provide an integrated radio beam reception instrument which automatically gives the position of the plane with respect to the beam, by means of a single indication on an instrument dial.

Another object of the invention is to provide an improved gyro-compass construction whereby the compass reading is not only projected on an instrument dial utilized in common for the gyro-horizon and the beam reading, but also in which the compass reading is indicated on the dial in constant spaced relation to the radio beam reading.

A further object of the invention is to provide an aircraft instrument having a fixed convex dial on which combined instrument readings may be projected.

A further object of the invention is to provide an improved gyro-horizon adapted to give readings on a relatively fixed dial.

A still further object of the invention is to provide in an aircraft instrument a horizontally pivoted mirror in conjunction with a vertically pivoted mirror, whereby, the mirrors are actuated in accordance with radio impulses to project a single beam of light upon a curved instrument dial to provide beam readings for the aircraft.

Further objects will be apparent from the specification and drawings, in which:

Fig. 1 is a view diagrammatically showing the working parts of an instrument constructed according to the invention, in relationship with each other and the electrical connections;

Fig. 2 is a plan view of an aircraft instrument constructed in accordance with the invention with the instrument case broken away;

Fig. 3 is a side elevation of the structure of Fig. 1 with the instrument case similarly broken away to show the interior location and arrangement of the elements, and Figs. 4 to 6 are end views of the instrument dial showing it as it would appear to the pilot but with varying instrument readings.

Referring more particularly to the drawings, the instrument, in addition to combining three distinct readings, essential in making a "blind" landing, within the space formerly utilized by only one of these instruments, also employs a novel integrating device for the reception and indication of radio beam readings. Furthermore, the instrument is so designed that it may be installed in the instrument panel within a minimum of space and in the customary panel aperture.

The instrument is comprises of a generally cylindrical case 10 having at its forward end a transparent lens 11 mounted in annular fitting 12, which is in turn threaded to case 10. Spaced behind lens 11 is an outwardly convex dial 13, rigidly supported in case 10 by bracket 14, and made from a translucent material, such as ground glass or synthetic plastic, so that light projected on the rear of dial 13 is clearly visible when observed by the pilot through lens 11 which serves as a protection for the instrument and to prevent dust and dirt entering case 10.

Mounting bracket 15, secured to case 10 at a point to the rear of dial 13, serves to support horizontally pivoted mirror 16, vertically pivoted mirror 17, lens 18, and light bulbs 19 and 20, which may be illuminated by current from the standard aircraft battery of the airplane's electrical system. Mirror 16 is attached to arm 21, which is the rotating element of a conventional galvanometer or microammeter 22 illustrated diagrammatically in Fig. 1. Galvanometer 22 is energized by electrical impulses received from the glide path radio receiver designated generally by 23.

Also mounted in bracket 15, but on a vertical post 24, is mirror 17 which is actuated about a vertical axis by means of galvanometer 25 identical in construction with galvanometer 22 except that it is mounted in the vertical plane instead of a horizontal plane. Galvanometer 25 receives electrical impulses from the localizer radio receiving set designated generally by 26.

The construction and operation of the glide path and localizer radio receivers conforms to conventional practice and it is, therefore, believed unnecessary to describe these instruments in great detail. Each one, however, is a directional radio receiver having dipole antennae 30 and 30' connected to the conventional radio receiving units as indicated by the legends in Fig. 1. The glide path receiver is sensitive to electrical impulses received along a plane inclined horizontally to the runway (not shown) upon which it is desired to land the aircraft. When the glide path receiver receives impulses indicating that the receiving set and, consequently, the aircraft, is on the predetermined proper horizontal approach, galvanometer 22 receives no current from the set 23, and therefore, mirror 16 is at rest in a stationary vertical position with respect to case 10.

The operation of the localizer receiving set is identical except that radio impulses are received in accordance with deviation with respect to a predetermined vertical plane extending through the center line of the runway. Consequently, galvanometer 25 receives no current from localizer set 26 when the localizer and therefore the aircraft are in line with the runway, but as soon as the plane becomes out of alignment, electrical energy flows to galvanometer 25 thereby causing mirror 17 to pivot on a vertical axis in proportion to the amount of current received which is in turn proportional to the amount of deviation. In other words, it will be understood that mirror 16 is responsive to vertical deviation from a predetermined glide path and mirror 17 is responsive to horizontal deviation from the center line of the runway. It will be understood that in actual practice both the vertical and horizontal planes increase in thickness, so to speak, depending upon the distance from the runway, but since the radio beam and its operation are well known and do not form a part of the invention it is believed that further explanation of this art is unnecessary.

The combined indication of both vertical and horizontal deviations from the proper approach are indicated on dial 13 by means of a beam of light emanating at bulb 20 which is projected through lens 18 onto mirror 17, thence to mirror 16 and thence to the inside of dial 13. This beam of light appears as a bright spot on the dial as shown in Figs. 4–6. When no current is received by either galvanometer 22 or 25, the dot appears on dial 13 at the intersection of cross hairs 40 and 41 as shown in Fig. 4. But when, for example, current is received only by galvanometer 25 due to electrical impulses from localizer set 26 the dot will be displaced horizontally on cross hair 41 to a position indicated in Fig. 5. This would indicate to the pilot that the airplane has correct altitude or, in other words, is on the proper glide approach, but correction must be made horizontally in order that he may land on the runway.

Likewise, if galvanometer 22 receives impulses from glide path receiver 23 to cause the dot to vary either in an upward or downward direction on cross hair 40, the pilot is immediately aware that he is coming in in line with the runway but that correction must be made in altitude since the plane is either above or below the required glide path and he will land short of, or overshoot the runway, as the case may be.

The use of two mirrors pivoted on axes set at 90 degrees for the purpose of giving an integrated or combined radio beam reading is of great advantage in making instrument landings and reduces the likelihood of accidents because the pilot knows instantly the position of his plane with respect to the required flight path without the necessity of making any mental calculations or corrections whatsoever. This has heretofore been impossible with instruments designed for this purpose because the vertical and horizontal deviations have been independently indicated on the instrument.

It will be understood that considerable variation is possible with respect to the relative location of lamp 20, lens 18, mirrors 16 and 17 as well as dial 13. The optimum relationship and relative angles, however, will be primarily a matter of choice in the construction of any particular instrument. Furthermore, if desired, it is possible to eliminate lens 18 entirely and provide concave mirrors at 16 and 17 which can, simultaneously, condense the light beam emanating from lamp 20 and, at the same time, correct for spherical aberration as well as angularity of the mirror locations.

A conventional gyro-compass designated generally by 45, is mounted in housing 10 directly in back of bracket 15 which, however, extends upwardly to position lamp 19 inside the standard rotating compass card 46. Card 46 is provided with transparent indicia to indicate the compass reading, and light beams from bulb 19 pass through these indicia to lens 18 and mirrors 16 and 17. This construction provides that the compass reading at all times appears directly above the radio beam reading on dial 13 since the light from bulb 19 is reflected from the same mirrors 16 and 17 as the light from bulb 20. An especial advantage of this feature of the invention resides in the fact that the pilot is enabled to obtain his compass reading simultaneously with the beam reading since these two indications always appear on dial 13 in the same spaced relationship.

Compass 45 is otherwise constructed in accordance with conventional practice and has a gyroscopic element 47 gimbaled to casing 10 at 48 and 49 in such a manner that card 46 always remains stationary with respect to the earth's axis, whereas, casing 10 actually rotates about the stationary gyroscope. Housing 50 connects the gyroscope with suitable air lines in accordance with standard practice.

A slightly modified gyro-horizon, designated generally by 55, is mounted in case 10 directly in back of compass 45. This instrument likewise is constructed in accordance with standard practice and is mounted in case 10 by means of bracket 56 and end plate 57. The instrument is comprised of the customary gyroscopic element 58 gimbaled about a transverse axis at 59 and 60 and about a longitudinal axis at 61 and 62. Connection 63 provides the conventional air lines for driving the gyroscope, also entirely in accordance with customary practice. Gimbal ring 64 carries indicator arm 65 pivoted at 66 in such a manner that rotation of case 10 about the longitudinal center line of the instrument as seen in Fig. 2 produces relative movement between the indicator arm 65 and the dial 13 which is mounted in the case 10.

It must be thoroughly understood in connection with gyroscopic instruments that the gyroscope always remains stationary in respect to the earth's axis, whereas, the instrument casing moves in accordance with the altitude or direction of the airplane so that what appears to be tilting movement of the indicating element, for example, arm 65, is in effect movement of the case about the longitudinal axis through gimbals 61 and 62.

While the indicator arm 65 remains stationary in so far as the true horizon is concerned, the arm which carries parallel indicator wires 67 at right angles to the arm and extending in front of dial 13, does have a limited up and down movement with respect to the gyroscope 58. This action is permitted through the pivoted mounting of the arm at 66 in a transverse plane plus the action of pin 68 which is anchored in the stationary gyroscope 58 and positioned in slot 69 of the arm. Therefore, when the airplane and, consequently, case 10 pivots about gimbals 59 and 60 up and down motion about pivot 66 is transmitted to the arm 65 with pin 68 as a fulcrum. Since the case 10 and gimbal ring 64 both pivot about gimbals 59 and 60, and since pin 68 is located between gimbal 60 and pivot 66, it will be apparent that a diving attitude of the plane will cause the wire 67 to move upwards with respect to dial 13 as shown in Fig. 6 and conversely when the plane is put into a climb the wires will be lowered as shown in Fig. 5.

In other words, let us now assume that the airplane and, consequently the instrument housing 10, is flying on a level course and that there is zero bank. Wires 67 will then appear horizontal and in line with cross hair 41 as shown in Fig. 4. However, should the pilot operate his elevator in such a way to cause the plane to climb but still without any turning, wires 67 appear to drop on dial 13 to the position indicated in Fig. 5.

Fig. 6 illustrates the condition with which the plane is put into a left bank during a dive since it will be remembered that wires 67 are always in a true horizontal position or, indicate the true horizon.

Suitable limit stops for the arm 65 as well as mirrors 16 and 17 are provided, but not illustrated, in the interest of clarity.

I have thus described an aircraft instrument which is designed primarily to eliminate accidents during "blind" landings because it enables the pilot to obtain all the essential information which he must know in order to make a successful "blind" landing merely by glancing at one position in his instrument board. The dial of the instrument is so constructed that he can, in a split second, estimate his exact approach in its relation to the required flight path for a safe landing and also it permits him to tell at once what corrections must be made in his course to compensate for any possible deviation. While the instrument finds its greatest usefulness in making so called "blind" landings it will be apparent it greatly facilitates many features of flight and take-off which are not related either to landing or to strictly "blind flying."

My instrument is especially designed to utilize to the best possible advantage standard component parts with only slight modifications, and it is also intended to be installed in the instrument panels of modern aircraft with a minimum of alteration. This feature is important in that the instrument is capable of installation on all types of aircraft, particularly, private passenger planes, and its expense is not so great that even small plane owners and pilots would not be able to take full advantage of the safety features which it affords.

Having thus described my invention, I claim:

1. An aircraft instrument having a housing, an outwardly convex dial rigidly mounted near one end of said housing, a bracket attached to the housing, a glide path galvanometer mounted in the bracket, said galvanometer having a current responsive indicator rotating about an axis in a plane parallel to the longitudinal axis of the instrument, a mirror mounted on said indicator, a localizer galvanometer mounted in said bracket and having an indicator mounted to rotate about an axis in a transverse plane to the longitudinal center line of the instrument casing, a mirror attached to the localizer indicator, a source of light mounted on said bracket, a gyroscopic compass mounted in the instrument housing in back of said bracket, a second bulb on the bracket so positioned that light emanating from the second bulb shines through the compass card of the compass and into the lens and mirrors, a gyro-horizon mounted in the housing in back of the compass, an indicator arm extending from the gyro-horizon to the dial, means mounted on the indicator arm positioned in front of the dial to indicate relative movement of the arm with respect to the dial, and a pair of directional radio receiving sets for actuating the galvanometers in accordance with a predetermined flight path of an aircraft.

2. An instrument constructed according to claim 1 having a lens between the light source and one of the mirrors.

3. In a radio beam receiving system for aircraft, a glide path radio receiver on the aircraft, a localizer radio receiver on the aircraft, a galvanometer adapted to receive electrical energy from the glide path receiver, a second galvanometer adapted to receive electrical energy from the localizer receiver, a mirror on the moveable element of each galvanometer, said mirrors being set on axes at 90 degrees to each other, a light source mounted in the instrument, and a dial mounted in the instrument whereby a beam of light emanating from the light source impinges upon both mirrors and the dial to form a single indication on the dial of energy transmitted from the radio receivers to their respective galvanometers.

4. Apparatus in accordance with claim 3 in which the dial carries a horizontal and a vertical cross hair indicating respective zero positions of the mirrors.

5. Apparatus in accordance with claim 3 in which a lens is placed between the source of light and the first mirror.

6. Apparatus in accordance with claim 3 in which the mirrors are concave.

7. Apparatus in accordance with claim 3 in which the dial presents a concave surface to the light beam.

8. Apparatus in accordance with claim 3 in which the dial is constructed of a translucent material whereby the indication may be observed from the opposite side of the dial.

RICHARD WM. FRENCH.

REFERENCES CITED

The following references are of record in the file of this patent:

UNITED STATES PATENTS

| Number | Name | Date |
|---|---|---|
| 2,134,932 | Smith | Nov. 1, 1938 |
| 2,262,033 | Moseley | Nov. 11, 1941 |
| 2,262,245 | Moseley | Nov. 11, 1941 |
| 2,283,190 | Crane | May 19, 1942 |
| 2,326,835 | Carter | Aug. 17, 1943 |
| 2,384,484 | Norden et al | Sept. 11, 1945 |
| 2,400,232 | Hall | May 14, 1946 |